United States Patent
Cao et al.

(10) Patent No.: US 9,053,384 B2
(45) Date of Patent: Jun. 9, 2015

(54) FEATURE EXTRACTION UNIT, FEATURE EXTRACTION METHOD, FEATURE EXTRACTION PROGRAM, AND IMAGE PROCESSING DEVICE

(75) Inventors: Yunyun Cao, Tokyo (JP); Hirofumi Nishimura, Kanagawa (JP); Sugiri Pranata, Singapore (SG); Zhiheng Niu, Singapore (SG)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 99 days.

(21) Appl. No.: 13/819,508

(22) PCT Filed: Jan. 13, 2012

(86) PCT No.: PCT/JP2012/000175
§ 371 (c)(1),
(2), (4) Date: Feb. 27, 2013

(87) PCT Pub. No.: WO2012/098842
PCT Pub. Date: Jul. 26, 2012

(65) Prior Publication Data
US 2013/0163870 A1 Jun. 27, 2013

(30) Foreign Application Priority Data
Jan. 20, 2011 (JP) .................................. 2011-010238

(51) Int. Cl.
*G06K 9/46* (2006.01)
(Continued)

(52) U.S. Cl.
CPC .......... *G06K 9/4642* (2013.01); *G06K 9/00281* (2013.01); *G06K 9/56* (2013.01); *G06K 2009/4666* (2013.01)

(58) Field of Classification Search
CPC .............. G06K 9/4604; G06K 9/4671; G06K 2009/00281
USPC ......... 382/164, 168, 170, 173, 190, 195, 199, 382/201, 224
See application file for complete search history.

(56) References Cited

U.S. PATENT DOCUMENTS 6,985,628 B2 * 1/2006 Fan ............................. 382/224
2006/0029276 A1   2/2006 Nagahashi et al.
(Continued)

FOREIGN PATENT DOCUMENTS

CN        1973300 A      5/2007
JP        2007-188504 A  7/2007
(Continued)

OTHER PUBLICATIONS

International Search Report for PCT/JP2012/000175 dated Feb. 14, 2012.
(Continued)

*Primary Examiner* — Amir Alavi
(74) *Attorney, Agent, or Firm* — Pearne & Gordon LLP

(57) ABSTRACT

Provided is a feature extraction device whereby it is possible, while using local binary patterns, to extract image features with which object detection which is robust against disparities in a photographic environment is possible. A feature extraction unit (440) comprises: a binary pattern generation unit (443) which generates, for each of all pixels or partial pixels in an image, local binary patterns which denote, by bit values, whether the difference in pixel values between the pixel and the surrounding adjacent pixels is greater than or equal to a threshold value; a weighting generation unit (444) which determines, for each generated local binary pattern, a weighting according to the pixel value difference; and a histogram generation unit (445) which applies the determined weightings to the corresponding local binary patterns and generates a histogram which denotes the distribution of the local binary patterns which are generated from the image.

6 Claims, 11 Drawing Sheets

(51) Int. Cl.
G06K 9/00 (2006.01)
*G06K 9/56* (2006.01)

(56) References Cited

U.S. PATENT DOCUMENTS

| | | | |
|---|---|---|---|
| 2006/0104510 A1* | 5/2006 | Aharon et al. | 382/173 |
| 2007/0160308 A1 | 7/2007 | Jones et al. | |
| 2009/0220155 A1 | 9/2009 | Yamamoto et al. | |
| 2009/0220156 A1* | 9/2009 | Ito et al. | 382/201 |
| 2012/0308121 A1* | 12/2012 | Datta et al. | 382/155 |
| 2012/0321142 A1* | 12/2012 | Trojanova et al. | 382/117 |
| 2013/0163870 A1* | 6/2013 | Cao et al. | 382/170 |
| 2014/0023280 A1* | 1/2014 | Lin et al. | 382/218 |

FOREIGN PATENT DOCUMENTS

| | | |
|---|---|---|
| JP | 2009-211179 A | 9/2009 |
| JP | 2011-186595 A | 9/2011 |

OTHER PUBLICATIONS

Timo Ahonen et al "Face Description with Local Binary Patterns: Application to Face Recognition" IEEE, Pattern Analysis and Machine Intelligence vol. 28 No. 12, pp. 2037-2041, Dec. 2006.

Navneet Dalal et al "Histograms of Oriented Gradients for Human Detection" CVPR, 2005.

Search Report for CN Patent Application No. 201280002161.3 dated Dec. 25, 2014.

* cited by examiner

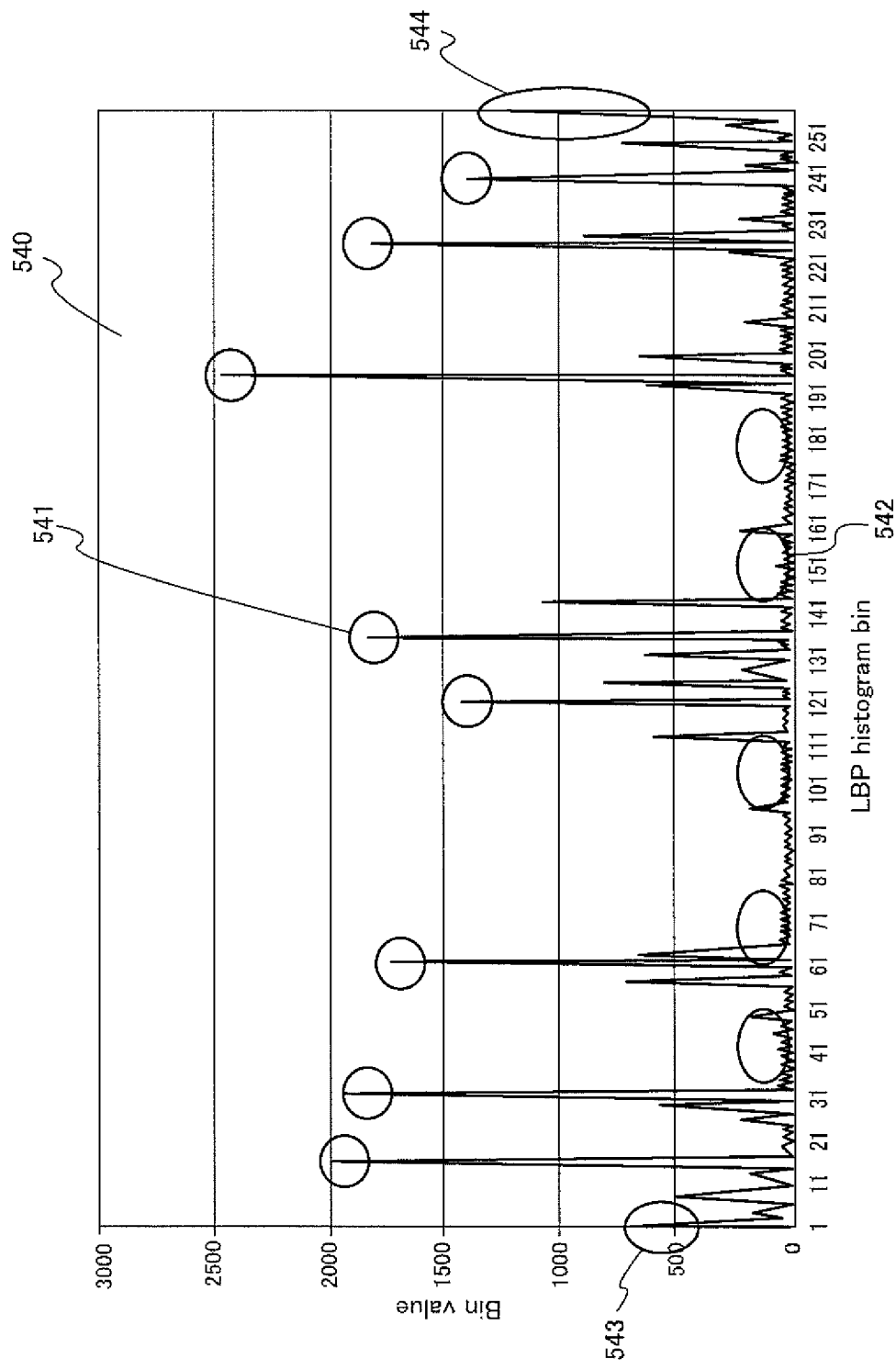

FEATURE EXTRACTION UNIT, FEATURE EXTRACTION METHOD, FEATURE EXTRACTION PROGRAM, AND IMAGE PROCESSING DEVICE

This application is 371 of PCT/JP2012/000175 filed on Jan. 13, 2012.

TECHNICAL FIELD

The present invention relates to a device, a method, and a program of extracting an image feature from image data, and to an image processing apparatus including such a device.

BACKGROUND ART

Techniques have been widely used that extract an image feature from image data for the detection or identification of an object included in an image (hereinafter, referred to as "object detection"). For example, a technique that uses Local Binary Patterns (hereinafter, referred to as "LBPs") is described in NPL 1 as one of such object detection techniques (hereinafter, referred to as "conventional technique").

LBP is a binary pattern created by calculating differences in intensities between each pixel and its surrounding neighborhood pixels and arranging the resulting binary numbers. Gray scale patterns in an image can be extracted using LBPs.

The conventional technique determines LBPs of all or a part of pixels within a region in an image targeted for identification (hereinafter, referred to as "target image"). The conventional technique then generates a histogram of values of the LBPs as an image feature. The conventional technique also generates a classifier in advance using histograms generated from images bounding a predetermined object and images not bounding the object (hereinafter, collectively referred to as "training images") and stores the classifier. The conventional technique then evaluates the histogram of the target image using the classifier to determine whether the target image includes the predetermined object.

Histograms of LBPs can represent differences in texture and gray scale patterns more accurately than image features such as histograms of oriented gradients (HOGs). Furthermore, the calculation of histograms of LBPs requires less processing cost compared with image features such as HOGs. Thus, the object detection using LBPs, such as the conventional technique, is expected to be applied to various fields.

CITATION LIST

Patent Literature

PTL 1
Japanese Patent Application Laid-Open No. 2009-211179
Non-Patent Literature
NPL 1
Timo Ahonen, Abdenour Hadid, and Matti Pietikäinen, "Face Description with Local Binary Patterns: Application to Face Recognition," IEEE, Pattern Analysis and Machine Intelligence vol. 28 no. 12, pp. 2037-2041, December 2006
NPL 2
Navneet Dalai and Bill Triggs, "Histograms of oriented gradients for human detection," CVPR, 2005

SUMMARY OF INVENTION

Technical Problem

Unfortunately, the conventional technique cannot detect an object with high accuracy unless all of the training images and target images have substantially the same levels of noise in images. In other words, the conventional technique cannot detect an object with high accuracy unless all the training images and target images are taken in a similar environment. It is because even images of the same target may have different LBPs due to variable noise levels and such differences in LBPs may occur in any part of the entire image.

An object of the present invention is to provide a device, a method, and a program of extracting image features that can be acquired from LBPs and allows object detection robust to variable photographic environments, and also to provide an image processing apparatus.

Solution to Problem

A feature extracting device of the present invention includes: a binary pattern generating section that generates a local binary pattern for each of all pixels or partial pixels in an image, the local binary pattern is represented by a set of bit values indicating whether differences in pixel values between a center pixel and surrounding neighbor pixels are each equal to or greater than a predetermined threshold; a weight generating section that determines a weight of each of the generated local binary patterns depending on the pixel value differences; and a histogram generating section that applies each determined weight to the corresponding local binary pattern to generate a histogram indicating a distribution of the local binary patterns generated from the image.

An image processing apparatus of the present invention includes an identifying section that identifies a predetermined object with a classifier to determine whether an image includes a predetermined object on the basis of a histogram generated by the feature extracting device.

A feature extracting method of the present invention includes: generating a local binary pattern for each of all pixels or partial pixels in an image, the local binary pattern is represented by a set of bit values indicating whether differences in pixel values between a center pixel and surrounding neighbor pixels are each equal to or greater than a predetermined threshold; determining a weight of each of the generated local binary patterns depending on the pixel value differences; and applying each determined weight to the corresponding local binary pattern to generate a histogram indicating a distribution of the local binary patterns generated from the image.

A feature extracting program of the present invention causes a computer to execute: a process of generating a local binary pattern for each of all pixels or partial pixels in an image, the local binary pattern is represented by a set of bit values indicating whether differences in pixel values between a center pixel and surrounding neighbor pixels are each equal to or greater than a predetermined threshold; a process of determining a weight of each of the generated local binary patterns depending on the pixel value differences; and a process of applying each determined weight to the corresponding local binary patterns to generate a histogram indicating a distribution of the local binary patterns generated from the image.

Advantageous Effects of Invention

According to the present invention, a histogram that can be acquired from LBPs and allows object detection robust to variable photographic environments can be extracted as a feature of an image.

BRIEF DESCRIPTION OF DRAWINGS

FIG. 8 illustrates an exemplary histogram of a target image in the embodiment;

DESCRIPTION OF EMBODIMENT

An embodiment of the present invention will now be described in detail with reference to the accompanying drawings.

Figure 1:
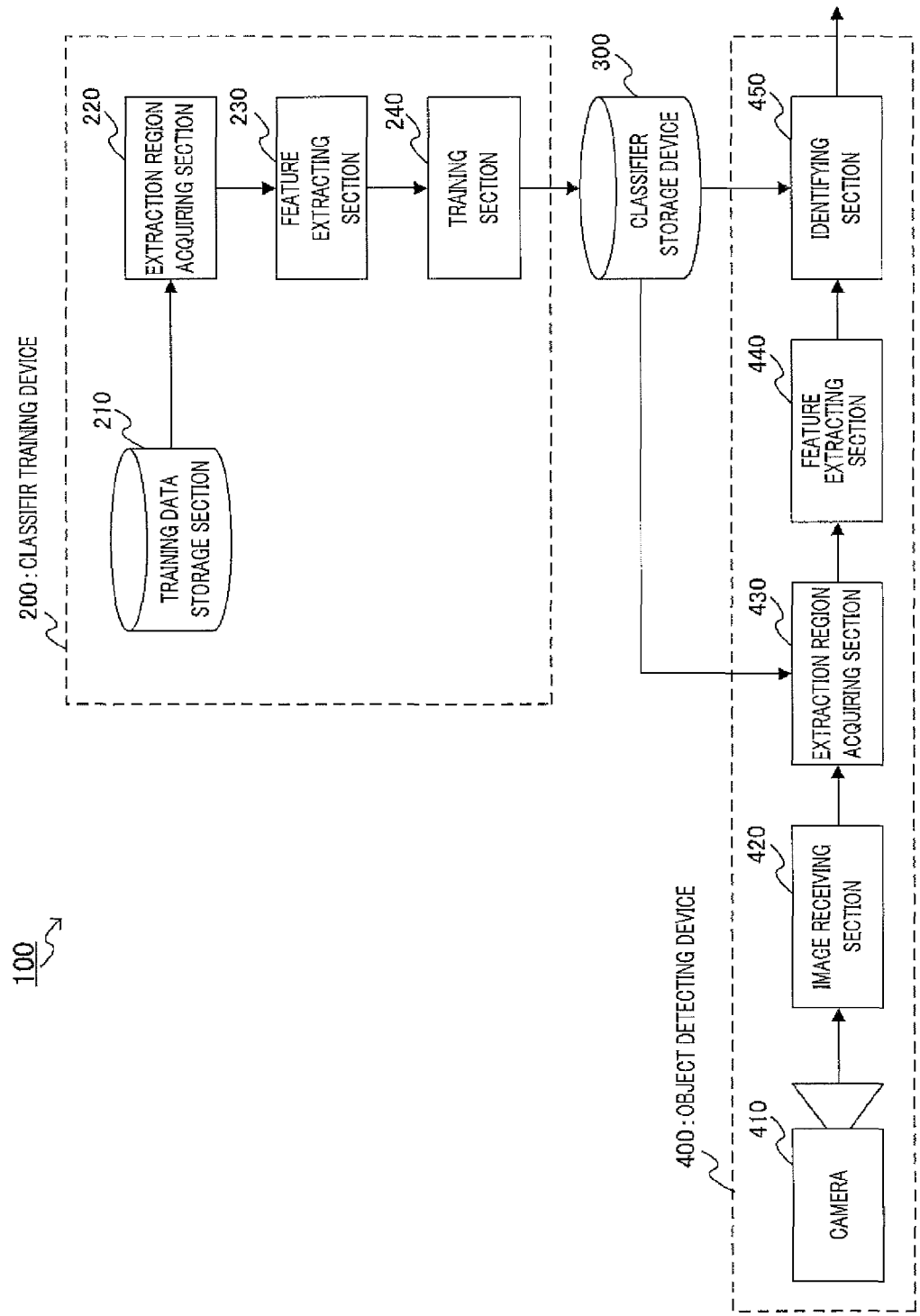
FIG. 1 is a system block diagram illustrating the configuration of an object detecting system including a feature extracting device according to an embodiment of the present invention.

FIG. 1 is a system block diagram illustrating the configuration of an object detecting system including a feature extracting device according to an embodiment of the present invention. FIG. 1 also illustrates the configurations of respective devices.

Object detecting system 100 of FIG. 1 includes classifier training device 200, classifier storage device 300, and object detecting device 400. Classifier training device 200 and object detecting device 400 are each connectable to classifier storage device 300 via a communication network (not shown) such as the Internet.

Classifier training device 200 uses Boosting as a machine learning method. Classifier training device 200 generates a classifier for the detection of a target object (hereinafter, referred to as "detection target object") from training images prepared in advance and stores the resultant classifier in classifier storage device 300.

Classifier training device 200 includes training data storage section 210, extraction region acquiring section 220, feature extracting section 230 having the feature extracting device according to the present invention, and training section 240.

Training data storage section 210 preliminarily stores multiple training images (positive samples) including detection target objects and multiple training images (negative samples) including no detection target objects therein.

Extraction region acquiring section 220 acquires a feature extraction region from each training image stored in training data storage section 210 and outputs the acquired regions to feature extracting section 230.

The feature extraction regions are image regions targeted for the extraction of an image feature. For example, if a detection target is a human face, the feature extraction regions may be many randomly disposed image regions including image regions of parts, such as eyes and a nose, of a human face. If the detection target is the whole body of a human, the feature extraction regions may be many randomly disposed image regions including image regions of a head, arms, and feet, for example.

Feature extracting section 230 extracts an image feature from each feature extraction region and outputs the extracted image features to training section 240. More specifically, feature extracting section 230 generates an LBP for each of all the pixels or partial pixels in each feature extraction region. Feature extracting section 230 then generates a histogram indicating the distribution of the generated LBPs (hereinafter, simply referred to as "histogram") as an image feature of the feature extraction region.

The LBP is information indicating whether differences in pixel values between a pixel of interest and its surrounding neighbor pixels are each equal to or greater than a predetermined threshold, using bit values, as described above.

It should be noted that feature extracting section 230 assigns a weight to corresponding one of the LBPs depending on the pixel value differences to generate a histogram.

Training section 240 generates one or more classifiers. The one or more classifiers are used to distinguish an image including a detection target object from an image including no detection target objects on the basis of the histogram group acquired from positive samples and the histogram group acquired from negative samples. That is, training section 240 generates both of the extraction region information and identification information as classifiers. Training section 240 then transmits the generated identification information with the extraction region information to classifier storage device 300 and stores these information items in association with each other.

The extraction region information indicates an area of a feature extraction region and includes the position and size of the feature extraction region, for example. The identification information is used to evaluate the histogram of the feature extraction region of a target image to determine whether the target image includes a predetermined object.

Object detecting device 400 acquires a classifier stored in classifier storage device 300 for the object detection from a target image.

Object detecting device 400 includes camera 410, image receiving section 420, extraction region acquiring section 430, feature extracting section 440 having a feature extracting device according to the present invention, and identifying section 450.

Camera 410 takes a target image and outputs the target image to image receiving section 420.

Image receiving section 420 scans the target image with a window having a predetermined size and outputs the individual scanned image regions (hereinafter, referred to as "window regions") to extraction region acquiring section 430.

Extraction region acquiring section 430 acquires an area within each window region, indicated by the extraction region information stored in classifier storage device 300, as a feature extraction region. Extraction region acquiring section 430 then outputs the acquired feature extraction region to feature extracting section 440.

Note that the processing performed by extraction region acquiring section 430 on a window region is similar to the above-described processing performed by extraction region acquiring section 220 on training images. That is, extraction region acquiring section 220 acquires all of the many randomly disposed regions as feature extraction regions, for example. In contrast, extraction region acquiring section 430 acquires only a region indicated by the extraction region information already selected by training section 240 from classifier storage device 300, as a feature extraction region.

Thus, a description of the configuration and operation of one of extraction region acquiring sections 430 and 220 will be substituted for that of the other without duplicated description.

Feature extracting section 440 extracts an image feature from each feature extraction region and outputs the extracted feature to identifying section 450. More specifically, feature extracting section 440 generates an LBP for each pixel in a feature extraction region and generates a histogram of LBPs as an image feature of the feature extraction region.

It is noted that feature extracting section 440 assign a weight to each of the LBPs depending on the corresponding pixel value difference to generate a histogram. In other words, feature extracting section 440 considers the magnitudes of the individual LBPs to generate a histogram.

Note that the processing performed by feature extracting section 440 is the same as the above-described processing performed by feature extracting section 230; hence, a description of the configuration and operation of one of the feature extracting sections 440 and 230 will be substituted for that of the other without duplicated description.

Identifying section 450 acquires identification information stored in classifier storage device 300. Identifying section 450 uses the acquired identification information to determine whether the target image includes a detection target object on the basis of the histogram generated from the window regions scanned by image receiving section 420. Identifying section 450 then notifies the user of the results of determination through an image display device and/or a voice output device (not shown), for example.

Figure 2:
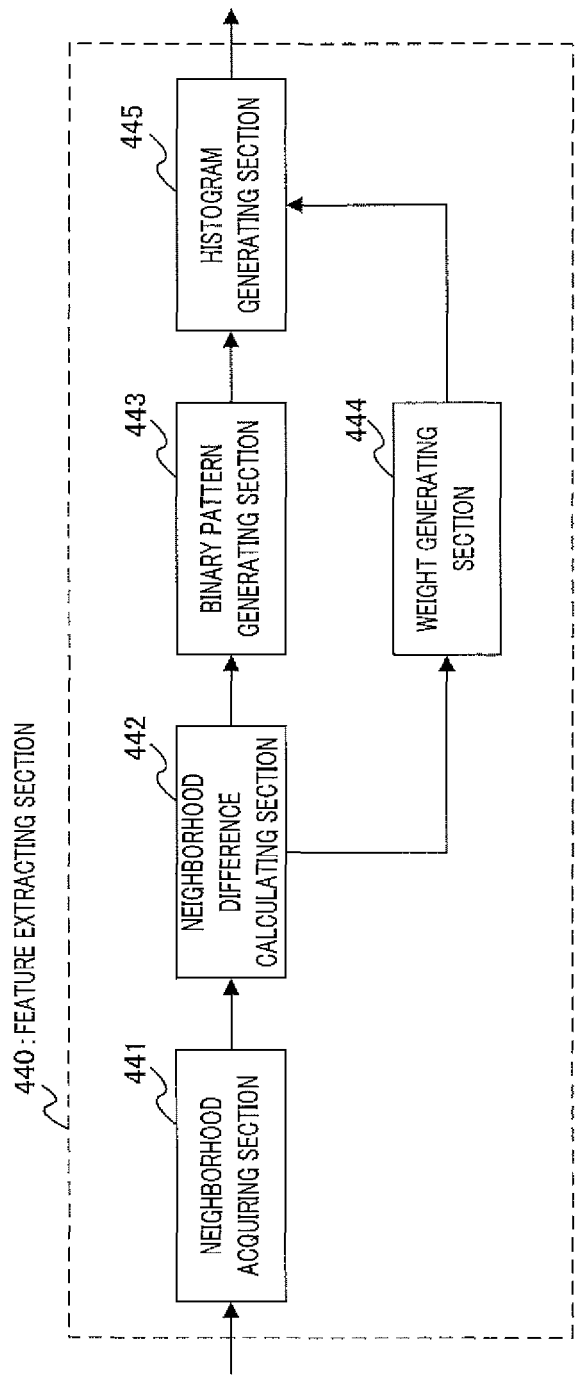
FIG. 2 is a block diagram illustrating the detailed configuration of a feature extracting section in the embodiment.

FIG. 2 is a block diagram illustrating the detailed configuration of feature extracting section 440.

Feature extracting section 440 of FIG. 2 includes neighborhood acquiring section 441, neighborhood difference calculating section 442, binary pattern generating section 443, weight generating section 444, and histogram generating section 445.

Neighborhood acquiring section 441 shifts a pixel of interest to the next one in a feature extraction region. Neighborhood acquiring section 441 acquires values of nine pixels configuring a 3×3-pixel region, i.e., a pixel of interest and the surrounding pixels (hereinafter, referred to as "neighborhood region"), for each pixel of interest. Neighborhood acquiring section 441 then outputs the acquired nine pixel values to neighborhood difference calculating section 442, for each neighborhood region.

A pixel value may be of any type such as the first derivative or the second derivative of a grayscale value acquired by processing an image with edge enhancement, or a color value that is one vector value represented by the intensities of red, blue, and green. A grayscale intensity is adopted as a pixel value in the present embodiment.

Neighborhood difference calculating section 442 calculates the difference in grayscale values between the pixel of interest and each of the surrounding neighbor pixels, for each neighborhood region, to give the results of eight calculations (hereinafter, referred to as "neighborhood differences"). Neighborhood difference calculating section 442 then outputs the neighborhood differences of each neighborhood region to binary pattern generating section 443 and weight generating section 444.

Binary pattern generating section 443 generates a code in which bit values indicating whether each neighborhood difference is equal to or greater than a predetermined threshold are arranged in a predetermined order, for each neighborhood region. Binary pattern generating section 443 then outputs the generated codes to histogram generating section 445 as LBPs.

Weight generating section 444 determines the sum of the absolute values of the eight neighborhood differences of each neighborhood region to be a weight of the corresponding LBP, and outputs the resultant weights to histogram generating section 445.

Histogram generating section 445 generates a histogram of LBPs of each feature extraction region and outputs the resultant histograms to identifying section 450 in FIG. 1.

Each time histogram generating section 445 receives an LBP, this section assigns the weight input in association with the LBP to the bin value corresponding to the LBP.

Classifier training device 200 and object detecting device 400 may each be a computer including a CPU (central processing unit) and a storage medium such as RAM (random access memory). In this case, classifier training device 200 and object detecting device 400 operate in response to the execution of stored control programs by the CPU.

Object detecting device 400 may also be a dedicated chip for the calculation. Classifier storage device 300 is, for example, a network server including storage media such as semiconductor memory and a hard disk.

In a weighted histogram created as described above, the weight of the LBP of a neighborhood region having a considerable intensity difference (contrast) are relatively high. That is, the LBP of a neighborhood region that have a clearer gray scale pattern are relatively weight higher. The erroneous binary patterns caused by noise are relatively weight lower.

If a classifier is generated using such an image feature to detect an object, the confidence coefficients of the respective LBPs can be reflected on the object detection.

Thus, object detecting system 100 according to the present embodiment can detect an object in an image using an image feature that is acquired from LBPs and used for object detection robust to variations in photographic environments.

The operation of object detecting device 400 will now be described. Note that the operation of feature extracting section 230 in classifier training device 200 is the same as that of feature extracting section 440 in object detecting device 400; hence, a redundant description will be omitted.

Figure 3:
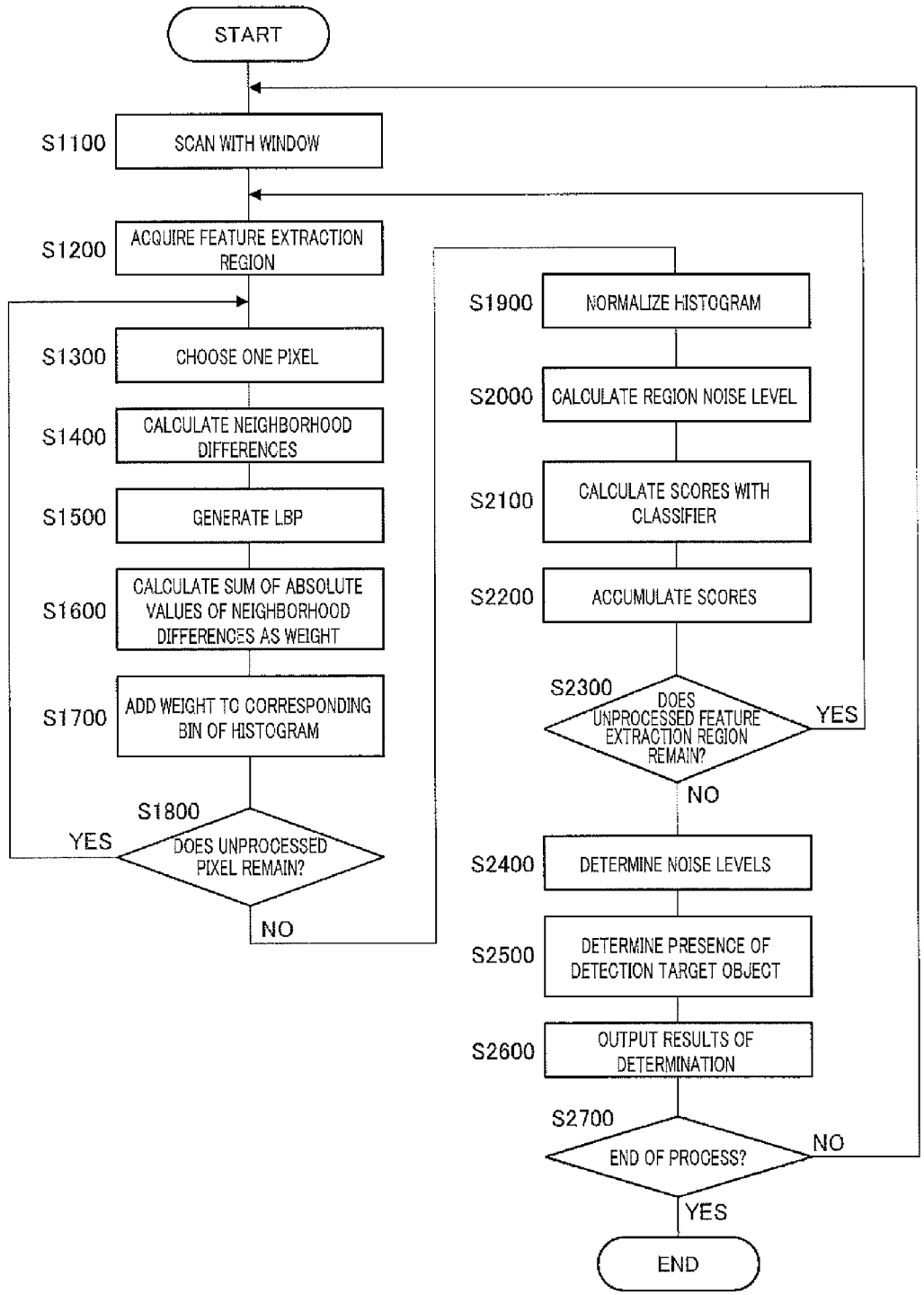
FIG. 3 is a flow chart illustrating the operation of an object detecting device according to the embodiment.

FIG. 3 is a flow chart illustrating the operation of object detecting device 400.

In step S1100, image receiving section 420 scans a target image with a window having a predetermined size.

Figure 4:
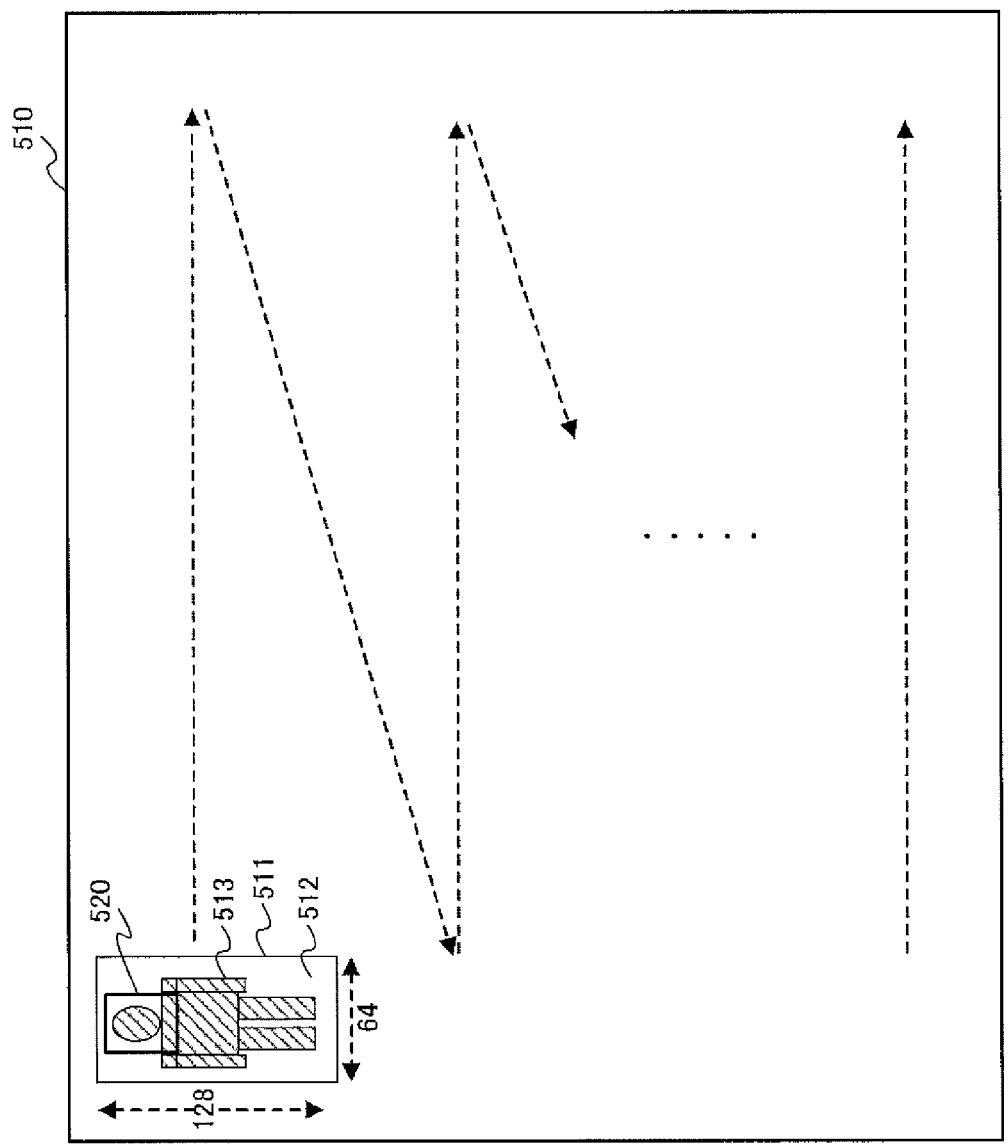
FIG. 4 is a schematic diagram illustrating an example of image scanning in the embodiment.

FIG. 4 is a schematic diagram illustrating an example of the image scanning.

Figure 5:
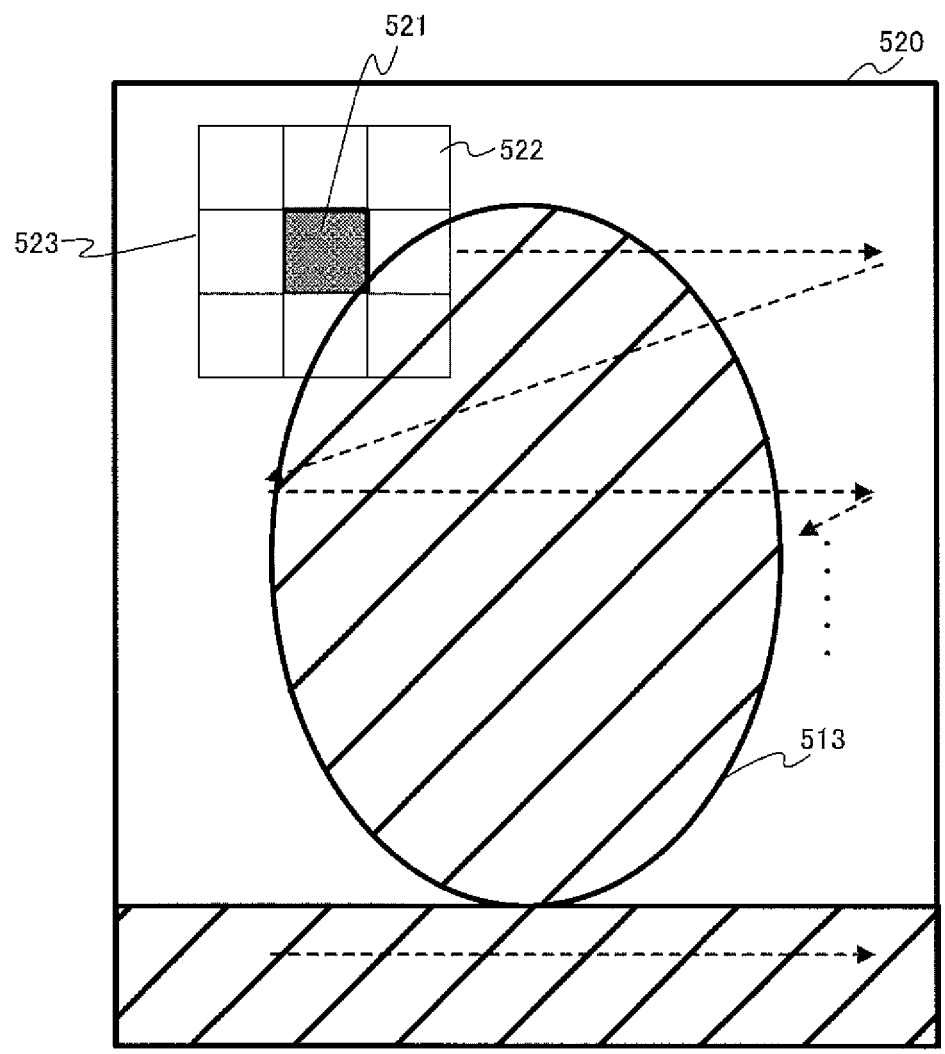
FIG. 5 is a schematic diagram illustrating an example of shifting of a neighborhood region in the embodiment.

Image receiving section 420 scans entire target image 510 with window 511 having a predetermined size to obtain window regions 512 at various positions, as illustrated in FIG. 4. Window region 512 may include detection target object 513 depending on the position of window 511, as illustrated in FIG. 5. The size of window 511 is 64×128 pixels, for example.

In step S1200 of FIG. 3, extraction region acquiring section 430 acquires one item of extraction region information (e.g., a position and a size) obtained by classifier training device 200 and stored in classifier storage device 300. Extraction region acquiring section 430 acquires, for example, a rectangular region including a human head as feature extraction region 520, as illustrated in FIG. 4.

In step S1300, neighborhood acquiring section 441 in feature extracting section 440 chooses one pixel from the feature extraction region as a pixel of interest and determines a neighborhood region having the pixel of interest at its center.

Neighborhood acquiring section 441 chooses an unchosen pixel each time the process returns to step S1300 after the determination process in step S1800 described later, resulting in pixel-wise shifting of a neighborhood region.

FIG. 5 is a schematic diagram illustrating an example of the shifting of a neighborhood region.

Neighborhood acquiring section 441 shifts the position of a pixel chosen as pixel of interest 521 within the entire of feature extraction region 520, as illustrated in FIG. 5. As a result, 3×3-pixel neighborhood region 523 consisting of pixel of interest 521 and its eight neighbor pixels 522 therearound is determined one after another in the entire of feature extraction region 520.

In step S1400 of FIG. 3, neighborhood difference calculating section 442 in feature extracting section 440 calculates the differences in intensity values between the pixel of interest and the eight neighbor pixels (neighborhood differences).

In step S1500, binary pattern generating section 443 in feature extracting section 440 binarizes the neighborhood differences to generate an LBP.

Supposing that the intensity value of the pixel of interest be "$g_c$," the number of neighbor pixels (eight, in the present embodiment) "P," a serial number of a neighbor pixel "p," the intensity value of the p-th neighbor pixel "$g_p$," and the number of pixels corresponding to the radius of a neighborhood region (one, in the present embodiment) "R," $LBP_{P,R}$ is expressed by Equation 1, for example. The coordinates of the p-th neighbor pixel are expressed by [Rcos(2 πp/P), Rsin(2πp/P)].

(Equation 1)

$$LBP_{P,R} = \sum_{p=0}^{P-1} s(g_p - g_c)2^p, s(x) = \begin{cases} 1, x \geq 0 \\ 0, x < 0 \end{cases} \quad [1]$$

In step S1600, weight generating section 444 in feature extracting section 440 calculates the sum of the absolute values of the eight neighborhood differences as a weight. Weight $W_{P,R}$ is expressed by Equation 2, for example.

(Equation 2)

$$w_{P,R} = \sum_{p=0}^{P-1} |g_p - g_c| \quad [2]$$

In step S1700, histogram generating section 445 adds the weight $W_{P,R}$ to the bin corresponding to $LBP_{P,R}$, configuring the histogram.

In step S1800, neighborhood acquiring section 441 determines whether an unprocessed pixel remains in the feature extraction region.

If neighborhood acquiring section 441 determines that an unprocessed pixel remains (S1800: Yes), the process returns to step S1300 to choose the unprocessed pixel and repeats the same process flow. If neighborhood acquiring section 441 has processed all the pixels in the entire feature extraction region (S1800: No), the process proceeds to step S1900.

Figure 6:
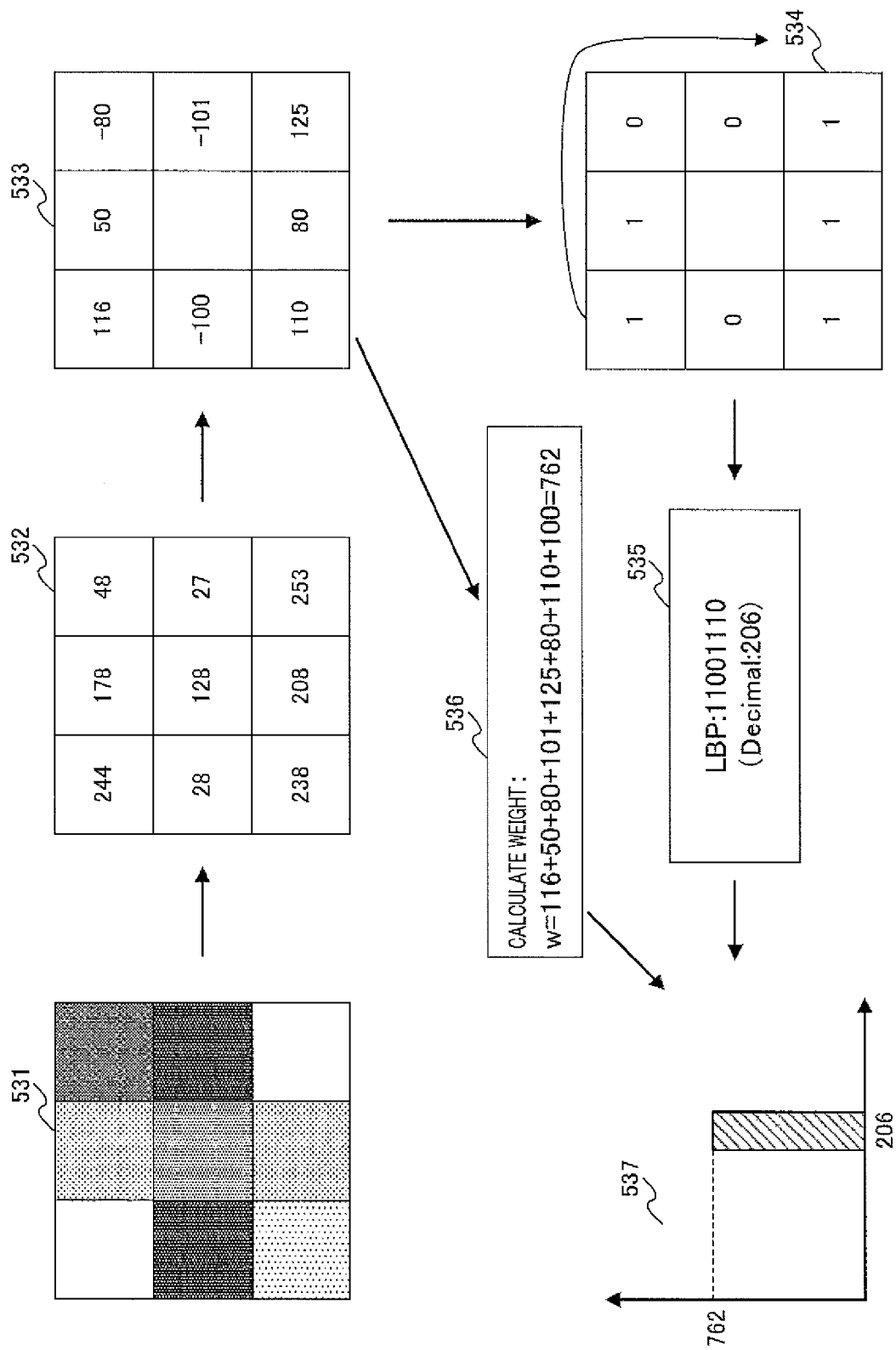
FIG. 6 is a schematic diagram summarizing an example of processing for generating a histogram in the embodiment.

FIG. 6 is a schematic diagram summarizing an example process until the LBP of a certain neighborhood region is reflected on a histogram.

It is assumed that neighborhood region 531 shows group of values 532 in which intensity value $g_c$ of a pixel of interest is "128" and intensity values $g_p$ of the neighbor pixels are [244, 178, 48, 27, 253, 208, 238, 28], as illustrated in FIG. 6.

It is assumed that intensity value $g_p$ is sequentially acquired from the upper left one of the neighbor pixels in a clockwise direction. In this case, group of values 533 consisting of neighborhood differences ($g_p$-$g_c$) results in [116, 50, −80, −101, 125, 80, 110, −100]. Now supposing the binarization threshold be "0," group of values 534 acquired by binarizing the neighborhood differences results in [1, 1, 0, 0, 1, 1, 1, 0]. LBP 535 results in "11001110" ("206" in decimal).

Weight (W) calculation 536 is equivalent to summing the absolute values of the neighborhood differences |$g_p$-$g_c$|, i.e., "W=116+50+80+101+125+80+110+100=762." Thus, histogram generating section 445 adds the weight "762" to the bin "206" to generate histogram 537.

Such repetitive addition of weights to corresponding bins eventually leads to a histogram indicating a feature of the feature extraction region image. Assuming that the maximum number of LBPs acquired from a feature extraction region having a size of I×J is K, histogram H(k) is expressed by Equation 3.

(Equation 3)

$$H(k) = \sum_{i=1}^{I} \sum_{j=1}^{J} w_{P,R}(i, j) \cdot f(LBP_{P,R}(i, j), k), \quad [3]$$

$$k \in [0, K],$$

where $$f(x, y) = \begin{cases} 1, \text{ if } x = y \\ 0, \text{ otherwise} \end{cases}$$

In step S1900 of FIG. 3, histogram generating section 445 normalizes the histogram to a feature independent of the size of the feature extraction region. Specifically, histogram generating section 445 normalizes the histogram using the sum of the values of all the bins in the histogram, for example. Assuming that the number of bins is N and the value of the i-th bin is $H_i$ (i=1, 2, . . . , and N), the sum of bin values $SumH_i$ is expressed by Equation 4.

(Equation 4)

$$SumH_i = \sum_{i=1}^{N} H_i \quad [4]$$

Value $H_i'$ of the i-th bin in the normalized histogram is expressed by Equation 5.

(Equation 5)

$$H_i' = \frac{H_i}{SumH_i} \quad [5]$$

FIG. 7 illustrates an example of normalization of a histogram.

Figure 7A:
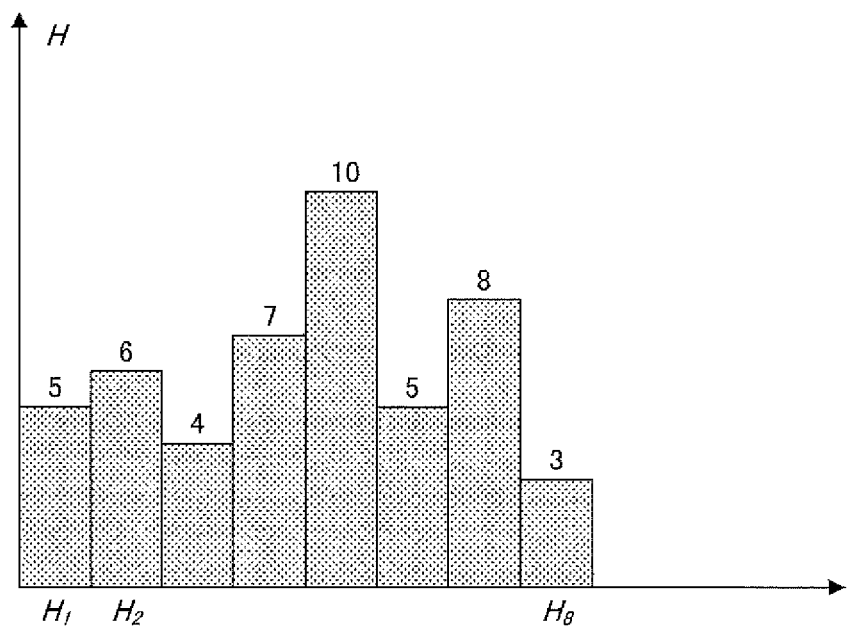
FIG. 7 illustrates an example of normalization of a histogram in the embodiment.

It is assumed that the values of bins $H_1, H_2, \ldots,$ and $H_8$ in a histogram before normalization are "5, 6, 4, 7, 10, 5, 8, and 3" in this order, as illustrated in FIG. 7A. In this case, the sum of the bin values $SumH_i$ is calculated using Equation 6.

(Equation 6)

$$\mathrm{Sum} H_i = \sum_{i=1}^{N} H_i = 5 + 6 + 4 + 7 + 10 + 5 + 8 + 3 = 48 \quad [6]$$

Figure 7B:
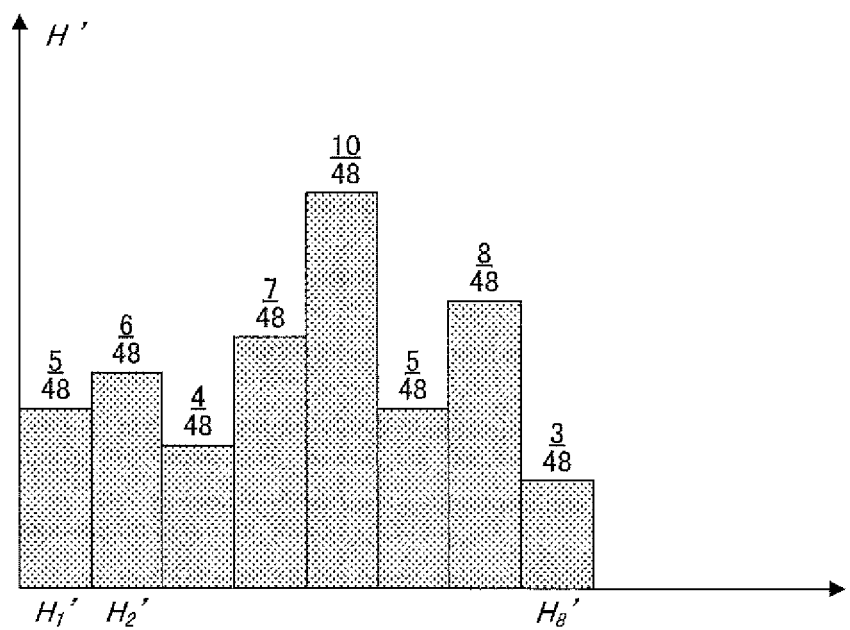

Values $H_1'$, $H_2'$, ..., and $H_8'$ of the bins in the normalized histogram are calculated as shown in Equation 7, resulting in values as shown in FIG. 7B.

(Equation 7)

$$H_1' = \frac{H_1}{\mathrm{Sum} H_1} = \frac{5}{48} \quad [7]$$

$$H_2' = \frac{H_2}{\mathrm{Sum} H_2} = \frac{6}{48}$$

$$\vdots$$

$$H_8' = \frac{H_8}{\mathrm{Sum} H_8} = \frac{3}{48}$$

FIG. 8 illustrates an example of a histogram generated from a target image.

Histogram 540 has peaks (denoted by part 541, for example) at bins corresponding to LBPs more frequently extracted from an image, as illustrated in FIG. 8.

The shape of histogram 540 representing a distribution of LBPs depends on an object included in an image. Thus, object detecting system 100 uses information on the positions of peaks in histogram 540 and on magnitudes of the peaks as an image feature for the identification of a detection target object. A larger difference in bin value between a peak and other parts (denoted by part 542, for example) in histogram 540 indicates a more distinctive image feature, and thus such an image feature can lead to highly accurate object detection.

In step S2000, identifying section 450 calculates a noise level in the feature extraction region of the target image (hereinafter, referred to as "region noise level") on the basis of the normalized histogram.

Specifically, identifying section 450 determines a high noise level of a target image in the case of a relatively high value of a bin corresponding to pixel-level noise that occurs as white or black dots (salt-and-pepper noise).

The bin corresponding to such noise is particularly corresponding to the LBP with all the neighborhood differences being positive values, namely, the bin corresponding to "255" in decimal.

Alternatively, such a bin corresponds to the LBP with all the neighborhood differences being negative values, namely, the bin corresponding to "0" in decimal.

Figure 9:
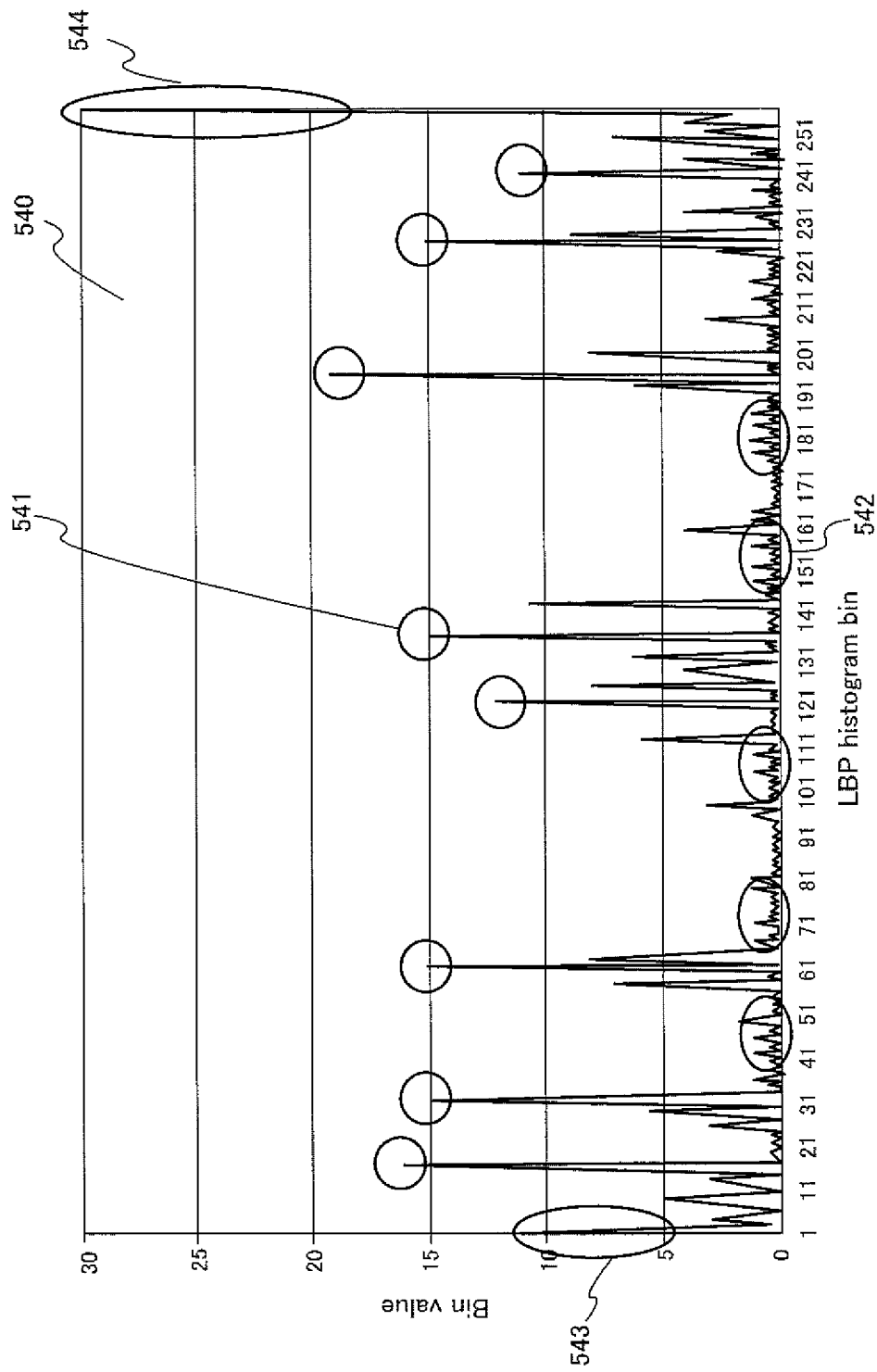
FIG. 9 illustrates a typical histogram generated by a conventional technique.

FIG. 9 illustrates an example of an unweighted histogram generated by the conventional technique, and corresponds to FIG. 8.

As illustrated in FIG. 9, histogram 540 generated by the conventional technique has a smaller difference between a peak denoted by part 541 and other parts denoted by part 542 than those observed in FIG. 8. It is because low-confidence information largely contributes to histogram 540. A larger difference between parts 541 and 542 in histogram 540 indicates a more distinct image feature, and thus such histogram 540 can accurately indicate the presence of an object.

Such weighting also improves the accuracy of determination of the above-described noise level.

The conventional technique has no difference in LBPs being "0" or "255" in decimal between the case of being caused by a very small intensity difference and the case of being caused by a significant intensity difference. That is, the conventional technique disadvantageously increases the values of the bins of the LBPs being "0" and "255" in decimal on the basis of pixels with the high possibility for noise.

As a result, the bin values associated with "0" and "255" in decimal are relatively high in spite of the same actual noise level, as shown by parts 543 and 544 in FIG. 9, in the conventional technique. Then, the object detection based on the values of the bins of "0" and "255" in decimal compromises determination accuracy.

In contrast, the values of the bins of "0" and "255" in decimal caused by very small intensity differences are low in histogram 540 generated by object detecting device 400. As seen from the comparison between FIG. 8 and FIG. 9, object detecting system 100 according to the present embodiment can determine the noise level with the high accuracy compared with the conventional technique.

Identifying section 450 may also additionally generate a histogram according to the conventional technique and determine the noise level of a target image on the basis of the comparison between the "0" bins and between the "255" bins. Specifically, identifying section 450 compares part 543 in FIG. 8 with part 543 in FIG. 9, and also compares part 544 in FIG. 8 with part 544 in FIG. 9, for example.

In step S2100, identifying section 450 acquires a classifier from classifier storage device 300. Identifying section 450 then uses the acquired classifier to calculate scores indicating likelihood used to determine whether a current feature extraction region includes the detection target object on the basis of the normalized histogram.

In step S2200, object detecting device 400 accumulates the calculated scores.

In step S2300, extraction region acquiring section 430 determines whether an unprocessed feature extraction region remains. Specifically, extraction region acquiring section 430 determines whether this section has calculated scores of all of the feature extraction regions associated with the extraction region information stored in classifier storage device 300.

If extraction region acquiring section 430 determines that an unprocessed feature extraction region remains (S2300: Yes), the process returns to step S1200 to process the unprocessed feature extraction region. If extraction region acquiring section 430 has processed all the feature extraction regions (S2300: No), the process proceeds to step S2400.

In step S2400, the noise levels of the scanned windows are determined using the region noise levels of all the feature extraction regions.

In step S2500, identifying section 450 determines whether each scanned window includes the detection target object on the basis of the accumulated score. That is, if the score is equal to or greater than a predetermined threshold, identifying section 450 determines that the particular window includes the detection target object. Note that identifying section 450 may also perform the determination on the basis of a predetermined function of the score.

In step S2600, identifying section 450 outputs the results of determination of the object detection.

Identifying section 450 may also determine whether a designated object is included in a target image, or determine what object is included in the target image. In the former case, identifying section 450 may use only a classifier corresponding to a designated object and output information indicating whether the object is included. In the latter case, identifying section 450 may use classifiers one after another to repeat determination and, if an object is detected, output information indicating what object is detected.

In step S2700, image receiving section 420 determines whether the instruction to finish the process has been input by operation.

If image receiving section 420 has not received such an instruction (S2700: No), the process returns to step S1100 to perform the next scan or process the next target image. If image receiving section 420 has received such an instruction (S2700: Yes), the device finishes the process.

In this manner, object detecting device 400 can generate a histogram of LBPs to which weights are assigned depending on neighborhood differences, and use the histogram as an image feature to detect an object. Note that classifier training device 200 also generates a histogram of LBPs to which weights are assigned depending on neighborhood differences, and use the histogram as an image feature to generate a classifier for the object detection, though a description thereof is omitted.

It will now be described that the histogram to which weights are assigned depending on neighborhood differences is an image feature that allows object detection robust to variable photographic environments.

Figure 10:
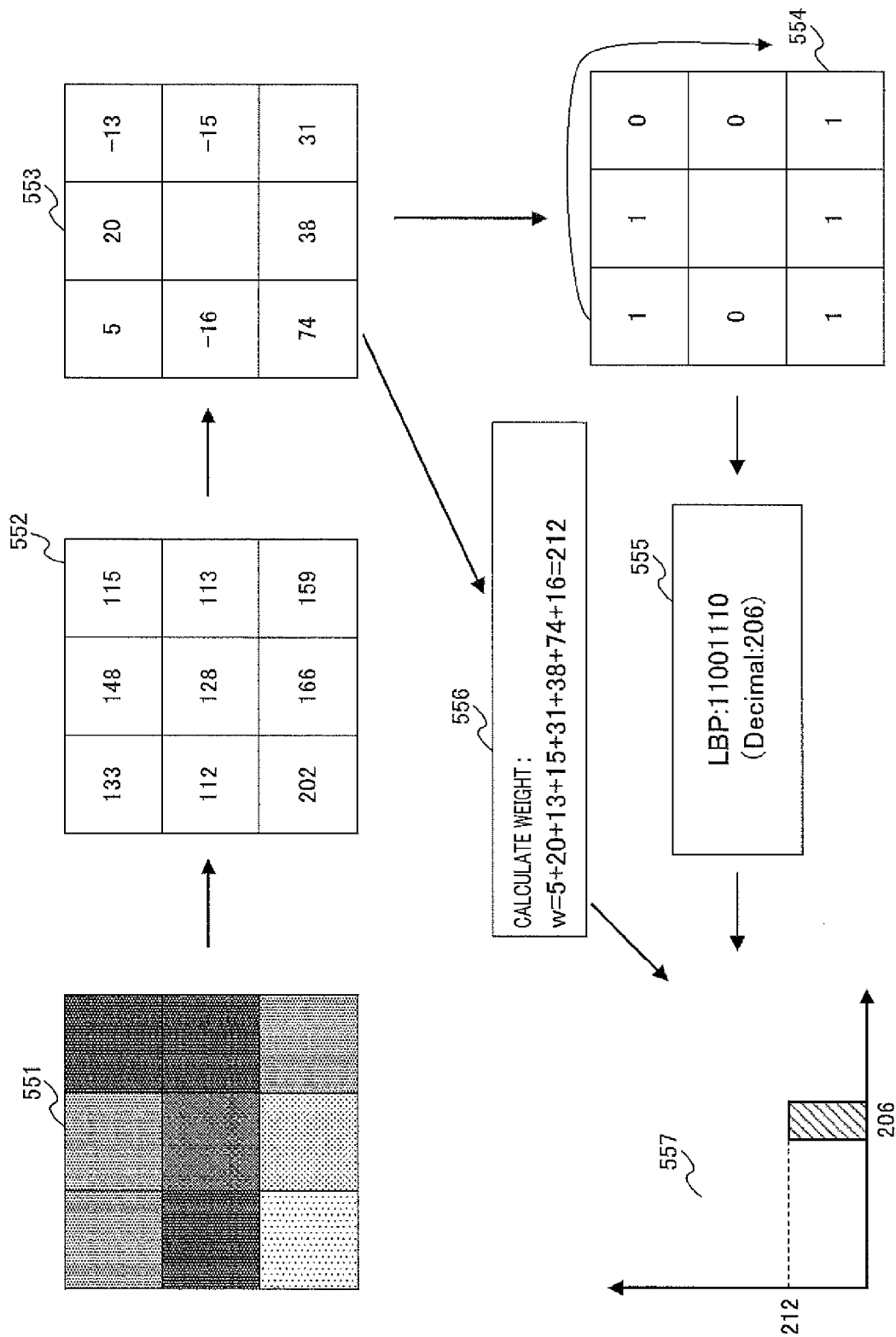
FIG. 10 is a schematic diagram summarizing another example of the processing for generating a histogram in the embodiment.

FIG. 10 is a schematic diagram summarizing an example of the process by object detecting system 100 for generating a histogram of LBPs acquired from a low-contrast image, and corresponds to FIG. 6.

It is assumed that value group 552 is acquired from neighborhood region 551 in which intensity value $g_c$ of a pixel of interest is "128" and intensity values $g_p$ of the surrounding pixels are [133, 148, 115, 113, 159, 166, 202, 112], as illustrated in FIG. 10. That is, the taken target image has lower contrast than that of the case in FIG. 6, and thus edge detection is challenging.

In this case, value group 553 of neighborhood differences ($g_p - g_c$) is [5, 20, −13, −15, 31, 38, 74, −16]. Value group 554 of binary numbers of the neighborhood difference is [1, 1, 0, 0, 1, 1, 1, 0]; hence, LBP 555 is "11001110" ("206" in decimal).

The weight W is calculated as follows: W=5+20+13+15+31+38+74+16=212 (block 556). Thus, histogram 557 is generated with the weight "212" added to bin "206."

Figure 11:
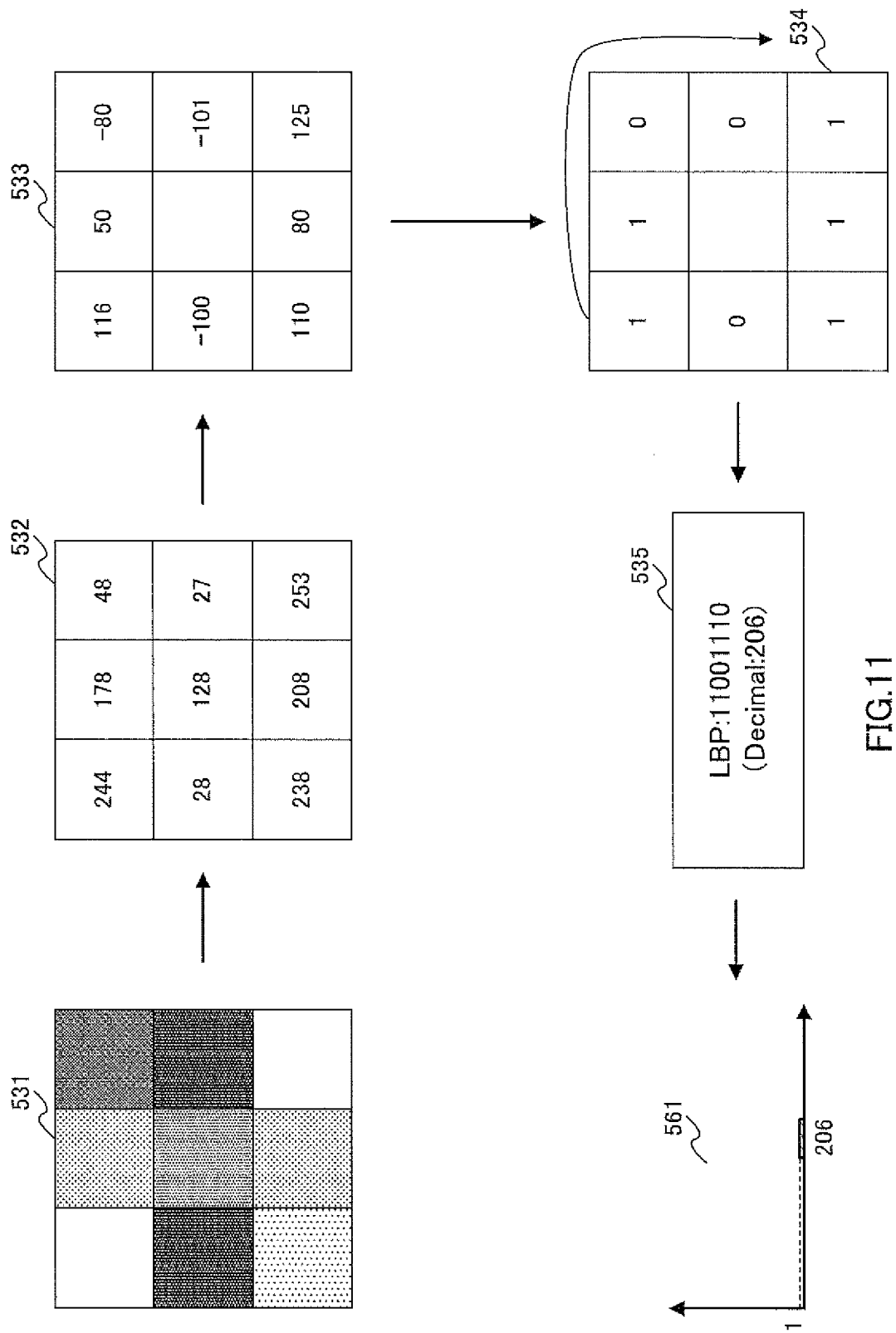
FIG. 11 is a schematic diagram summarizing a process for generating a histogram according to the conventional technique.

FIG. 11 is a schematic diagram summarizing a process for generating a histogram without weighting, according to the conventional technique, and corresponds to FIG. 6. The same block as that in FIG. 6 is assigned the same reference numeral and a description thereof will be omitted.

The conventional technique calculates LBP 535 being "11001110" ("206" in decimal) from neighborhood region 531 illustrated in FIG. 6 or FIG. 11, similarly to object detecting system 100 according to the present embodiment. The conventional technique, however, adds a fixed value such as "1" to bin "206" to generate histogram 561 without the above-described weight assigning. That is, histogram H(k) generated by the conventional technique is expressed by Equation 8.

(Equation 8)

$$H(k) = \sum_{i=1}^{I} \sum_{j=1}^{J} f(LBP_{P,R}(i, j), k),$$ [8]

$$k \in [0, K],$$

where $$f(x, y) = \begin{cases} 1, & \text{if } x = y \\ 0, & \text{otherwise} \end{cases}$$

The intensity differences in an image taken in an environment having a low luminous intensity probably represent a gray scale pattern with low accuracy. For this reason, if LBP 535 from a high-contrast image (see FIG. 6) and LBP 555 from a low-contrast image (see FIG. 10) are treated equally, low-confidence information largely contributes to a histogram. Thus, the accuracy of a classifier generated from the histogram and the accuracy of the object detection with the histogram are also low.

Under such circumstances, feature extracting sections 230 and 440 each calculate the sum of the absolute values of neighborhood differences, which have a significant correlation with contrast, as a weight, and generate a weighted histogram, as described above. That is, feature extracting sections 230 and 440 each numerically express the confidence of each LBP by the sum of the absolute values of neighborhood differences, the LBP being variable depending on the image quality even if an imaged target is the same object. The resultant confidence numbers are "762" and "212," for example. The confidence numbers are then reflected on the histograms as the weights for the addition to bin values. Thereby, feature extracting sections 230 and 440 can each extract a histogram that can be acquired from LBPs and allows object detection robust to variable photographic environments, as an image feature.

In this manner, object detecting system 100 according to the present embodiment assigns a weight to each pixel of interest depending on differences in intensity values between the pixel of interest and the surrounding pixels when generating a histogram indicating a distribution of LBPs. Thereby, object detecting system 100 can extract an image feature robust to fluctuations of image brightness and variable noise levels. That is, object detecting system 100 can extract an image feature that allows object detection robust to variable photographic environments.

Although classifier training device 200, classifier storage device 300, and object detecting device 400 have been separate from each other in the embodiment as hereinbefore described, they may have any other configuration. Specifically, two or all of them may also be integrated with each other as a single device. In particular, if classifier training device 200 is integrated with object detecting device 400, extraction region acquiring sections 220 and 430 can serves as a single functional section and feature extracting sections 230 and 440 can also serve as a single functional section. Although the machine learning method in the present embodiment uses Boosting, any other machine learning method such as SVM (support vector machine) or decision trees may also be applied.

The disclosure of the specification, the drawings, and the abstract included in Japanese Patent Application No. 2011-010238, filed on Jan. 20, 2011, is incorporated herein by reference in its entirety.

INDUSTRIAL APPLICABILITY

The device, method, and program of extracting a feature, and the image processing apparatus according to the present invention are useful as a device, method, and program capable of extracting an image feature that can be acquired from LBPs and allows object detection robust to variable photographic environments, and as an image processing apparatus including such a device.

REFERENCE SIGNS LIST

100 Object detecting system
200 Classifier training device

210 Training data storage section
220, 430 Extraction region acquiring section
230, 440 Feature extracting section
240 Training section
300 Classifier storage device
400 Object detecting device
410 Camera
420 Image receiving section
441 Neighborhood acquiring section
442 Neighborhood difference calculating section
443 Binary pattern generating section
444 Weight generating section
445 Histogram generating section
450 Identifying section

The invention claimed is:

1. A feature extracting device comprising:
a binary pattern generating section that generates a local binary pattern for each of at least a plurality of first pixels in an image, the local binary pattern being represented by a set of bit values indicating whether differences in pixel values between a first pixel of the plurality of first pixels and surrounding second pixels are each equal to or greater than a predetermined threshold, the second pixels being at predetermined positions relative to the first pixel;
a weight generating section that determines a weight of each of the generated local binary patterns depending on the differences in pixel values between the first pixel and the second pixels; and
a histogram generating section that applies each determined weight to the corresponding local binary pattern to generate a histogram indicating a distribution of the local binary patterns generated from the image,
wherein each local binary pattern is a code having digital values arranged in a predetermined order, the digital values indicating whether each of the differences between the first pixel and the second pixels are equal to or greater than the predetermined threshold.

2. The feature extracting device according to claim 1, wherein each weight depends on the sum of absolute values of the differences associated with the second pixels.

3. The feature extracting device according to claim 2, wherein
the weight generating section determines the sum of the absolute values of each of the generated local binary patterns as a weight, and
each time a local binary pattern is generated, the histogram generating section adds the weight corresponding to the local binary pattern to a value of a bin corresponding to the local binary pattern to generate the histogram.

4. The feature extracting device according to claim 3, wherein the histogram generating section normalizes the histogram.

5. An image processing apparatus comprising an identifying section that identifies a predetermined object using a classifier to determine whether an image includes the predetermined object on the basis of the histogram generated by the feature extracting device according to any one of claims 1 to 4.

6. The image processing apparatus according to claim 5, wherein
the classifier determines a noise level of the image on the basis of at least one of a bin value corresponding to the local binary pattern acquired if all the differences of the second pixels are positive values and a bin value corresponding to the local binary pattern acquired if all the differences of the second pixels are negative values.

* * * * *